United States Patent
Mitchell et al.

(10) Patent No.: US 6,230,181 B1
(45) Date of Patent: May 8, 2001

(54) MANAGEMENT SHUTDOWN AND RESET OF EMBEDDED SYSTEMS

(75) Inventors: Craig G. Mitchell, Mt. Prospect; Michael P. Dempsey, Chicago; Christian A. D'Souza, Mt. Prospect; Chandra S. Pandey, Rolling Meadows; Scot W. Salzman, Buffalo Grove, all of IL (US)

(73) Assignee: 3COM Corporation, Santa Clara, CA (US)

(*) Notice: Subject to any disclaimer, the term of this patent is extended or adjusted under 35 U.S.C. 154(b) by 0 days.

(21) Appl. No.: 08/963,402

(22) Filed: Nov. 3, 1997

(51) Int. Cl.$^7$ .................................................. G06F 9/00
(52) U.S. Cl. .................................. 709/100; 709/102
(58) Field of Search ..................... 709/100, 101, 709/102, 103, 104, 105, 106, 108

(56) References Cited

U.S. PATENT DOCUMENTS

| | | |
|---|---|---|
| 4,385,384 | 5/1983 | Rosbury et al. . |
| 4,587,651 | 5/1986 | Nelson et al. . |
| 4,652,874 | 3/1987 | Loyer . |
| 4,751,510 | 6/1988 | De Saint Michel et al. . |
| 4,796,292 | 1/1989 | Thomas . |
| 4,797,878 | 1/1989 | Armstrong . |
| 4,879,716 | 11/1989 | McNally et al. . |
| 4,890,316 | 12/1989 | Walsh et al. . |
| 4,955,020 | 9/1990 | Stone et al. . |
| 4,991,169 | 2/1991 | Davis . |
| 5,025,500 | 6/1991 | Phinney . |
| 5,063,523 | 11/1991 | Vrenjak . |
| 5,119,403 | 6/1992 | Krishnan . |
| 5,148,435 | 9/1992 | Ray, Jr. et al. . |
| 5,151,896 | 9/1992 | Bowman et al. . |
| 5,157,658 | 10/1992 | Arai et al. . |
| 5,166,931 | 11/1992 | Riddle . |
| 5,184,348 | 2/1993 | Abdelmouttalib et al. . |

(List continued on next page.)

OTHER PUBLICATIONS

Inside Macintosh, Processes, Addisen Wesley Publishing Co. pp. 8–3–8–20, 1992.*
M. Pecen, "A Bi–Directional Wire–Line to Local Area Network Interface Module: Summary of Functional Requirements and Fundamental Architecture" (Jan. 18, 1994).
M. Pecen, et al., "A Bi–Directional Wire–Line to Local Area Network Interface and Method: Prototype Specifications" (Aug. 10, 1993).
D. Fink and D. Christianson, eds., "Electronics Engineers' Handbook", Ch. 22, pp. 22–45 to 22–53 (1989).
C. Zewart, "Modem Handbook for the Communications Professional", pp. 15–41, 224–227 (1987).
J.A.C. Bingham, "The Theory and practice of Modem Design", pp. 37–55 (1988).
H.E. White, "A T1–Based DSP Modem for Interfacing Voice and Packet Networks", IEEE (1988).
P. Desmond, "Primary Access Adds PAD to network Access System", Network World, p. 17 (1991).

(List continued on next page.)

Primary Examiner—Majid Banankhah
(74) Attorney, Agent, or Firm—McDonnell Boehnen Hulbert & Berghoff (57) ABSTRACT

A system for shutting down and resetting an embedded system having a general purpose computing platform. A shutdown management driver generates a management reset according to a predetermined set of shutdown conditions. The shutdown and reset manager receive the management reset signal and initiate a shutdown of the operating system. When the operating system has shutdown, the second receipt of the management reset signal initiates a hardware reset.

49 Claims, 5 Drawing Sheets

Microfiche Appendix Included
(1 Microfiche, 13 Pages)

U.S. PATENT DOCUMENTS

| | | |
|---|---|---|
| 5,185,783 | 2/1993 | Takahashi et al. . |
| 5,187,735 | 2/1993 | Garcia et al. . |
| 5,199,071 | 3/1993 | Abe et al. . |
| 5,202,884 | 4/1993 | Close et al. . |
| 5,210,530 | 5/1993 | Kammerer et al. . |
| 5,220,560 | 6/1993 | Ogasawara . |
| 5,237,561 | 8/1993 | Pyhälammi . |
| 5,237,620 | 8/1993 | Deaton et al. . |
| 5,247,516 | 9/1993 | Bernstein et al. . |
| 5,255,309 | 10/1993 | Katz . |
| 5,259,023 | 11/1993 | Katz . |
| 5,303,266 | 4/1994 | Budin et al. . |
| 5,315,647 | 5/1994 | Araujo . |
| 5,361,259 | 11/1994 | Hunt et al. . |
| 5,374,952 | 12/1994 | Flohr . |
| 5,402,474 | 3/1995 | Miller et al. . |
| 5,410,754 | 4/1995 | Klotzbach et al. . |
| 5,416,776 | 5/1995 | Panzarella et al. . |
| 5,438,614 | 8/1995 | Rozman . |
| 5,528,595 | 6/1996 | Walsh et al. . |
| 5,577,105 | 11/1996 | Baum et al. . |

OTHER PUBLICATIONS

Advertisement for "Hot Swap Rack Systems Universal Input Power Factor Corrected or DC Inputs 24V and 48V" from Microsoft Internet Explorer, printed Sep. 9, 1997.

Advertisement for "Hot Swap 500 HP Series, Universal Input Power Factor Corrected or DC Inputs 24V and 48V" from Microsoft Internet Explorer, printed Sep. 9, 1997.

Advertisement for "Ezraid Pro, Faster Disk Transfer Simplified Data Management Real–Time Backups" from Microsoft Explorer, printed Sep. 9, 1997.

Advertisement for "Hot Swap" from Microsoft Internet Explorer, printed Sep. 9, 1997.

Advertisement for "Switching Power's Hot Swap Line Offers. . ." from Microsoft Internet Explorer, printed Sep. 9, 1997.

* cited by examiner

MANAGEMENT SHUTDOWN AND RESET OF EMBEDDED SYSTEMS

NOTICE REGARDING COPYRIGHT

This application contains a microfiche appendix which contain one microfiche having 13 frames.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

A. Field of the Invention

This invention relates to the field of computer systems and more particularly to the shutdown and reset of embedded systems.

B. Description of Related Art and Advantages of the Invention

Embedded computer systems typically operate in real-time or multi-tasking environments for specific applications. Such systems typically include a processor, RAM, ROM and an interface to hardware devices required by the application. A disk drive is not normally needed because the processor in embedded systems does not normally perform general purpose file-based applications. When embedded systems are shutdown, the status of the machine may be saved by storing certain variables in non-volatile RAM, or the status may be gracefully set to a power down state from which the system may be gracefully powered-up.

Real-time or multi-tasking operating systems are available with the capability of performing in a general purpose computing environment. However, the startup, shutdown and reset of such systems is typically performed from a terminal through user action from a keyboard or a mouse. A shutdown or reset that resembles a power off condition, for example, from a reset switch, may not be performed in such general purpose environments without corrupting system files. The shutdown from a reset switch does not provide the operating system with the opportunity to perform disk synchronization or to close and save temporary files that may be open.

Embedded systems having a general purpose computing environment are finding increasing use and expanding features. For example, communications access devices are typically embedded systems. Whereas communication access devices have been designed to perform a limited role in terms of call processing and routing, with the ultimate destination for the calls being one or more host computers on the local area network, communications servers provide the network access functions of an integrated communications router in addition to a general purpose computing platform. The platform runs a commercially available stand alone or shareware operating system such as Windows® NT from Microsoft Corporation. The software that runs on the computing platform may perform, for example, network management, remote access, intranet web page, and other functions.

A communication access device with the integral general purpose computing platform, as described herein, provides a substantial advancement in the features and capabilities of a communication access device. For example, in an embodiment in which the communication access device is connected to the network, improved remote access service may be achieved since the general purpose computing platform can route certain calls to the LAN while terminating other calls, such as those calls that require access to information that is stored locally in the memory in the general purpose computing platform. Additionally, the general purpose computing platform may provide enhanced network management service efficiently controlling the flow of calls between the access device and the network. The general purpose computing platform may also provide protocol proxy service and authentication services.

Other embedded systems may find an increase in features and advantages when combined with a general purpose computing environment. For many such embedded systems however, the need to shutdown the system from the keyboard or mouse to avoid corrupting system files may be inconvenient. For example, an embedded system may have the keyboard and mouse separated from the hardware that carries out most of the embedded system and general purpose computing functions. It would be desirable if a shutdown and reset function were available without the need to use a keyboard or mouse.

The present invention includes a push button for resetting an embedded system without the need for a keyboard or mouse. The present invention also includes a system for initiating a shutdown and reset of the system in response to predetermined shutdown/reset conditions.

These and many other features and advantages of the invention will become more apparent from the following detailed description of preferred embodiments of the invention.

SUMMARY OF THE INVENTION

An embedded system having a general purpose computing environment uses a management shutdown system for shutting down the embedded system. An operating system is included for performing embedded system functions and general purpose computing functions. A shutdown management driver generates a management reset signal in response to at least one shutdown condition. A shutdown and reset manager senses the shutdown condition and initiates a shutdown of the operating system in response to the management reset. The shutdown management driver generates a second management reset to reset the embedded system hardware and the shutdown and reset manager resets the hardware in response to the second management reset.

In a further aspect of the present invention, a method is provided for shutting down an embedded system having a general purpose computing environment and an operating system. The method includes the step of generating a management reset in response to a shutdown condition. The management reset is received and the operating system is shutdown in response. The operating system shutdown includes the step of saving any open temporary files.

DETAILED DESCRIPTION OF THE PREFERRED EMBODIMENT

Figure 1:
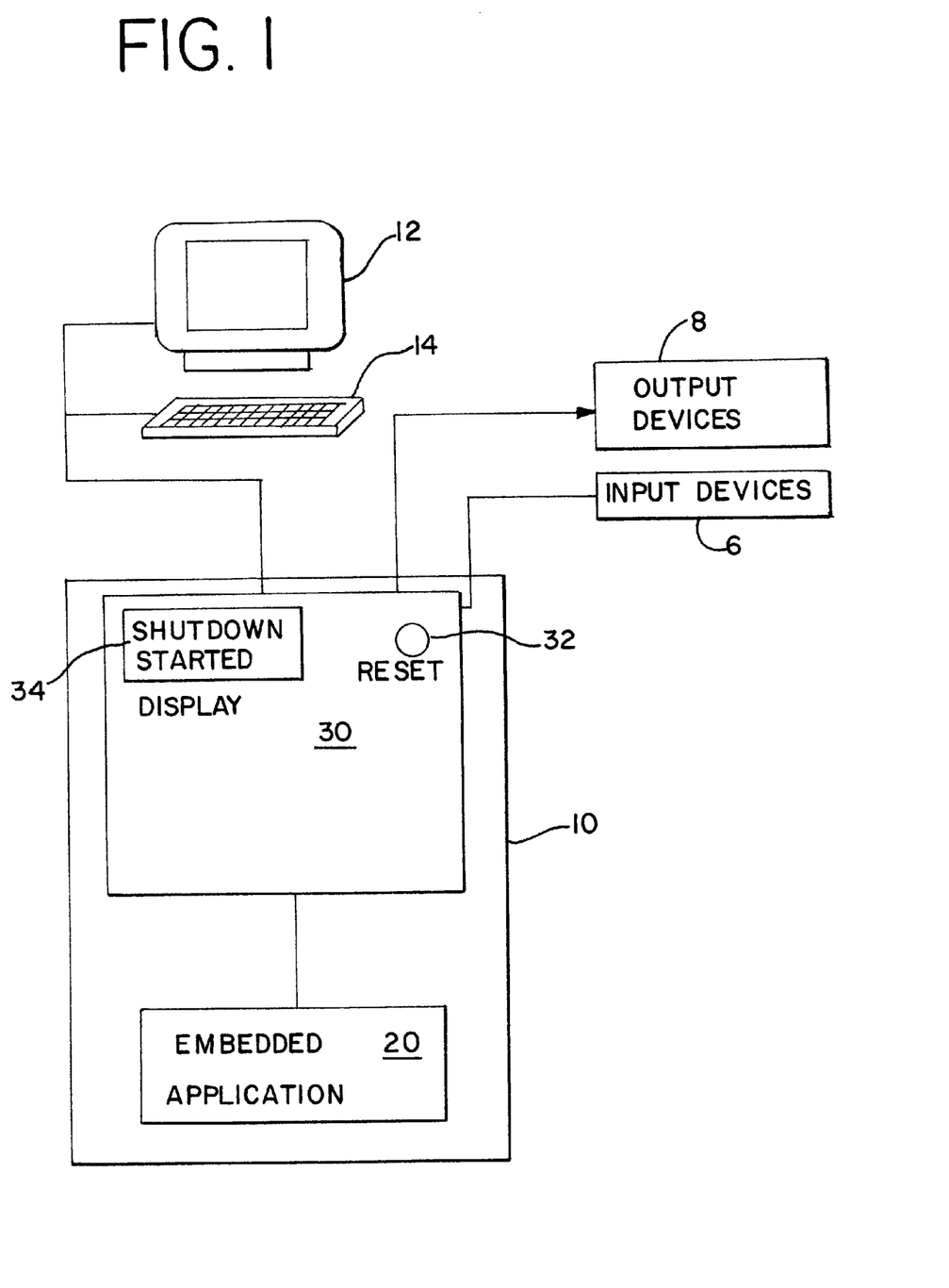
FIG. 1 is a block diagram of an embedded system in which the present invention finds particular use.

FIG. 1 is a block diagram of an embedded system 10 in which the present invention finds particular use. The embedded system 10 includes an embedded application 20 and a general purpose computing engine 30. The general purpose computing engine 30 includes a monitor 12 and a keyboard 14 to provide a user with an interface to general purpose applications. A plurality of output devices 8 and input devices 6 may be connected to the embedded system 10. The embedded system 10 also includes a reset button 32 and a status display 34.

The embedded application 20 includes the hardware and software components for performing real-time functions. The embedded application 20 in FIG. 1 may perform any set of real-time functions such as functions for controlling equipment in instrumentation, manufacturing and communications. The equipment is controlled by software components that function with one or more real-time operating systems. The embedded application may include circuitry that interfaces with general purpose computing engine 30. The circuitry may take the form of one or more modules having computing elements and software controlled by local real-time operating systems.

A real-time operating system, or an operating system with multi-tasking capabilities such as UNIX™-based operating system, Solaris 86™, Windows® NT™, Netware, etc., preferably runs in the general purpose computing engine 30 to provide the capability of performing functions that are part of the embedded application 20. The general purpose computing engine 30 also preferably includes general user applications that operate from a hard disk such as word processors, Internet browsers, spreadsheets, etc. One principal feature of the present invention is that the reset button 32 and a reset management system (described below with reference to FIGS. 3–6) in the general purpose computing engine 30 perform shutdown and reset operations that permit the operating system to shutdown in an orderly fashion. The orderly shutdown allows such operations as disk synchronization and the saving of temporary files and avoids the destructive shutdown previously associated with disk-based embedded systems.

Figure 2:
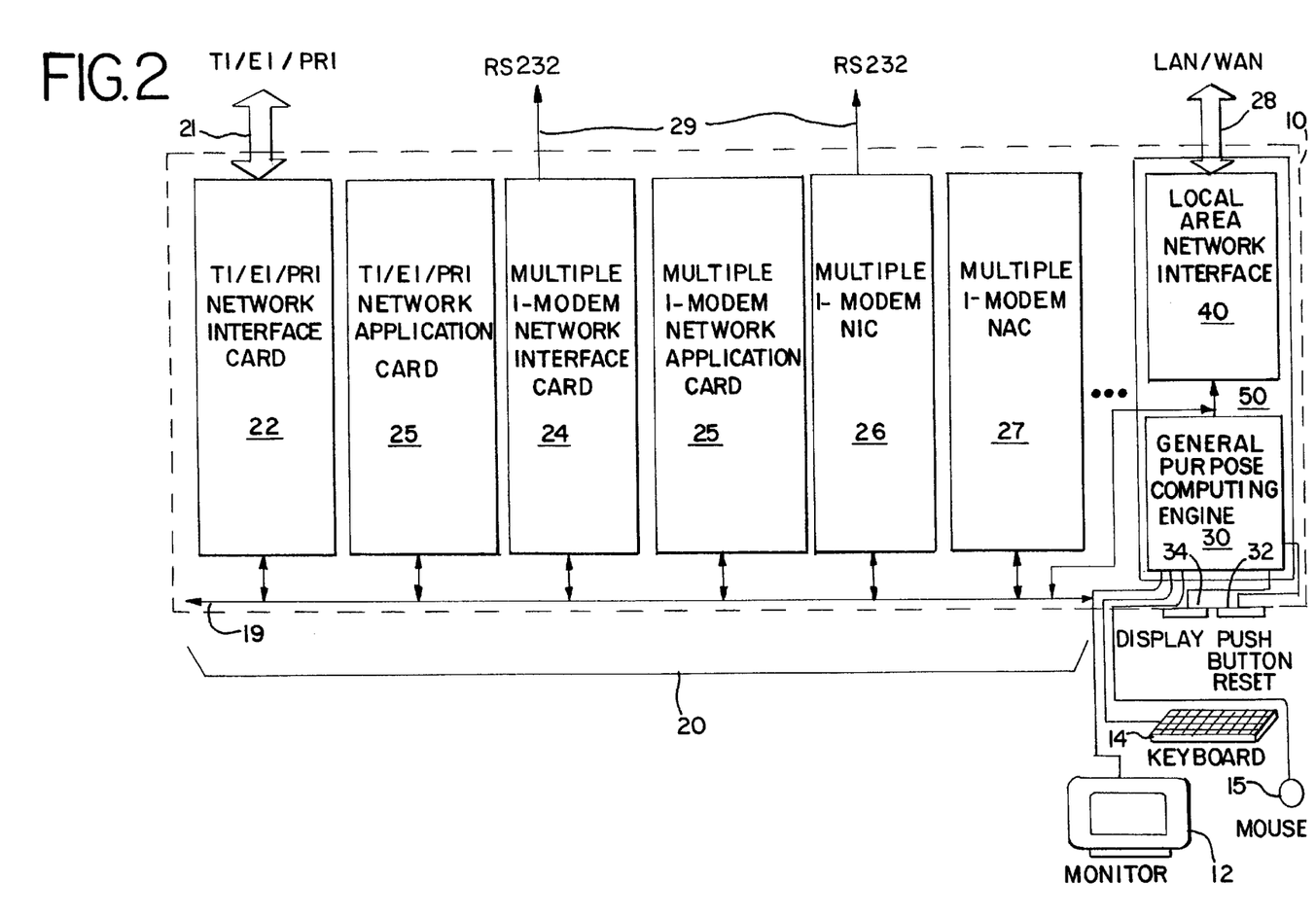
FIG. 2 is a block diagram of the system in FIG. 1 in which the embedded system is used as a communications system.

One example of the embedded system 10 of FIG. 1 is a product for providing network communications control. FIG. 2 is a block diagram of such a product, which is known commercially as the Total Control Network Enterprise Hub™, and is commercially available from 3COM Corp., 5400 Bayfront Plaza, Santa Clara, Calif., the assignee of the present invention. Persons of skill in the art are familiar with this product or with analogous products available from other telecommunications companies, such as Ascend Communications, Inc., Livingston, Communications, and Multitech.

The Total Control Network Enterprise Hub™ includes a plurality of cards in a communications chassis, one of the cards being a gateway card 50 which in a preferred embodiment is a product known as the EdgeServer™ card. The gateway card 50 in FIG. 2 includes the general purpose computing engine 30 and a local area network interface 40.

Other cards in the Total Control Network Enterprise Hub™ may include a T1/E1/PRI network interface card (NIC) 22, a T1/E1/PRI network application card (NAC) 23, one or more multiple modem network interface cards 24, 26 and one or more multiple modem network application cards 25, 27. The cards communicate with each other via a high speed internal chassis bus system 19. The T1/E1/PRI NIC 22 communicates externally via the T1/E1/PRI interface 21. The multiple modem NIC's 24, 26 communicate with attached computers over RS232 cables 29.

The chassis may optionally have a management card for managing the operation of the chassis. Such a management card may include the reset push button 32 and status display 34 as well as hardware and software components for managing the operation of the chassis. The management card may include hardware and software components that manage reset lines that are dedicated to individual cards.

The telephone line interface and application cards 22, 23 modem cards 24, 25, 26 27 and internal chassis bus 19, and computer network interface 40 of the gateway (or "EdgeServer Pro™") card 50 are described in great detail in terms of their component circuitry and operation in two issued United States patents, assigned to U.S. Robotics Access Corp., which are fully incorporated by reference herein: U.S. Pat. No. 5,577,105 of Baum et al., entitled "Telephone Call Switching and Routing Techniques for Data Communications," and U.S. Pat. No. 5,528,595 of Walsh et al., entitled "Modem Input/Output Signal Processing Techniques". The detailed structure of a preferred internal chassis bus 19 is described in U.S. Pat. No. 5,416,776 to Panzarella et al., entitled "Modem Backplane Techniques", also assigned to U.S. Robotics Access Corp., which is incorporated by reference herein. The management of a chassis by a management card is also described in detail in U.S. Pat. No. 5,436,614 to Panzarella et al., entitled "Modem Management Techniques," which is also assigned to U.S. Robotics Access Corp. and incorporated by reference herein.

Descriptions of examples of the EdgeServer Pro™ and of the Total Control Network Enterprise Hub™ may also be found in U.S. patent application Ser. No. 08/813,173 (titled "Communications Access Chassis with General Purpose Computing Platform" filed on Mar. 7, 1997) the contents of which are incorporated by reference herein. The cards that make up the chassis are also described in detail in the operators' manual that comes with the sale of the Total Control Network Enterprise Hub™, which is incorporated by reference herein.

Since the details of the telephone line interface and application cards 22, 23 modem cards 24, 25, 26, 27, internal chassis bus 19, computer network interface 40 of the gateway (or "EdgeServer Pro™") card 50 and the management cards (not shown) are already described elsewhere and persons skilled in the art already know how to build and design such circuits (or equivalent circuits), a detailed discussion of these components is not necessary. Additionally, the details as to the architecture or design of the embedded system are not particularly important. The particular arrangement of components on individual cards or the division of functionality (e.g., telephone interface, modem signal conversions, etc.) among individual cards is not important. The novelty of the present invention is believed to be in gracefully shutting down and resetting the embedded system. Thus, while the inventors' best mode known for practicing the invention will be set forth in the context of the particular system 10 of FIGS. 2–5, it will be appreciated that the inventors do not consider the invention limited to the particular system architecture or the particular embedded system application shown.

Figure 3:
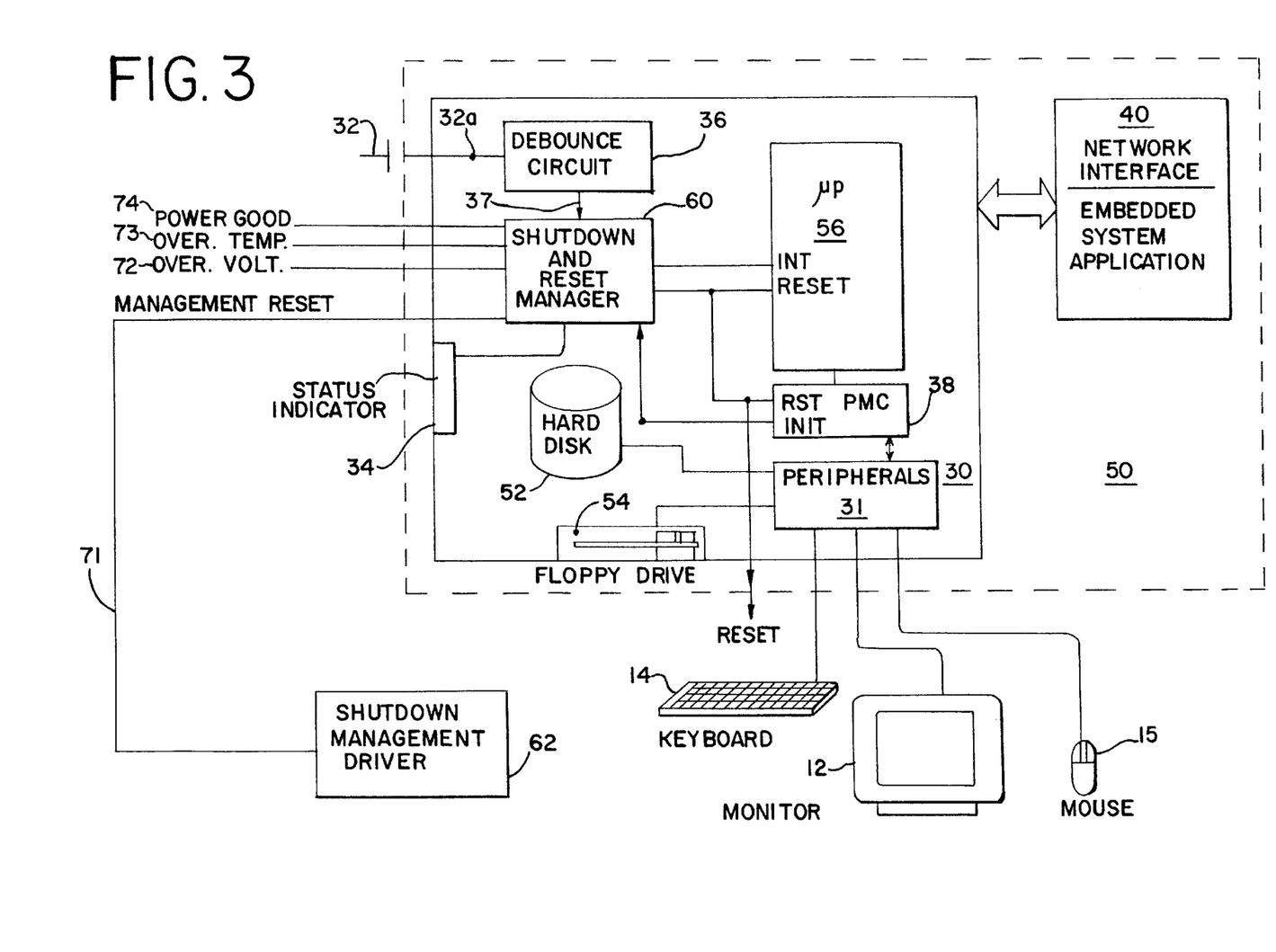
FIG. 3 is a block diagram of the general purpose computer sub-system in the system of FIG. 2.

FIG. 3 is a block diagram of the gateway card 50 in the embedded system of FIG. 2. The gateway card 50 has incorporated thereon the hardware and software components comprising a general purpose computing platform. For example, the gateway card 50 includes a microprocessor 56. The gateway card 50 further includes a peripheral control interface and memory controller having one or more user interface ports for receiving cables connected to user interface devices, such as the video monitor 12, the mouse 15, and the keyboard 14, enabling a user to interface with the general purpose computer in the system. The gateway card 50 further includes a hard disk memory 52 and a floppy disk drive 54 for storing and using commercially available software programs and databases and programs of interest to the remote users that may dial in to the system. The gateway card 50 may also include an external disk drive (not shown) enabling a user to download programs or data bases, or other information onto the hard disk, and a bus interface for connecting the general purpose computing platform to external memory storage devices on a bus such as a SCSI or SCSI-2 bus (not shown).

The gateway card 50 further includes the local area network interface 40 to an industry standard network used to connect remote computers to the system over the local area network 28 such as an Ethernet or Token Ring network. The network access and interface circuitry in the gateway card 50 performs certain protocol processing and placing the calls on a local or wide area network 28 that is connected to the system 10.

The gateway card 50 includes different ways to shutdown and reset the embedded system without causing file system corruption. The gateway card 50 includes a debounce circuit 36 and a shutdown and reset manager 60 for processing the shutdown and reset of the embedded system 10 without system corruption. The shutdown and reset of the embedded system 10 may be started when the user presses the reset button 32 or when a shutdown/reset condition is sensed. The reset button 32 is connected to the debounce circuit 36 which communicates a reset signal at 37 when the push button signal at 32a has reached a predetermined reset threshold level for a predetermined minimum threshold time. One preferred embodiment uses a MAX809 integrated circuit from MAXIM to implement the debounce circuit 36.

The reset signal at 37 feeds into the shutdown and reset manager 60. When the reset signal 37 is asserted, the shutdown and reset manager 60 generates an interrupt signal on the INT input of the microprocessor 56. During the interrupt service routine started by the interrupt signal, the shutdown of the operating system is initiated. The shutdown and reset manager 60 inhibits any further hardware reset until the operating system has completed the shutdown process. When the shutdown process has completed, the shutdown and reset manager 60 waits for a second push of the reset button 32. When the user pushes the reset button 32 a second time, the shutdown and reset manager 60 outputs a reset pulse to the microprocessor 56, the peripheral and memory controller (PMC) 38 and to any other hardware device that must be reset including hardware devices on other cards.

The embedded server may also be shutdown and reset at the gateway card 50 with user action using the keyboard and mouse to initiate shutdown at the operating system interface. An advantage of using the reset button 32 is that the keyboard and mouse may not be located where the chassis for the embedded system is located. If a user were to remove a card, or perform a maintenance function, the reset button 32 eliminates the need to locate the keyboard and mouse for entry of the shutdown command.

The shutdown and reset of the embedded system 10 may also be caused when a management reset line 71 is asserted. The management reset line is asserted by the shutdown management driver 62 which is a hardware or software component that controls a reset that permits a graceful shutdown of the operating system. Examples of functions that benefit from a graceful shutdown of the operating system include a system lockup, a watchdog timer timeout, or any system fault or other condition which may involve the shutdown of the system to permit user interaction.

Figure 4:
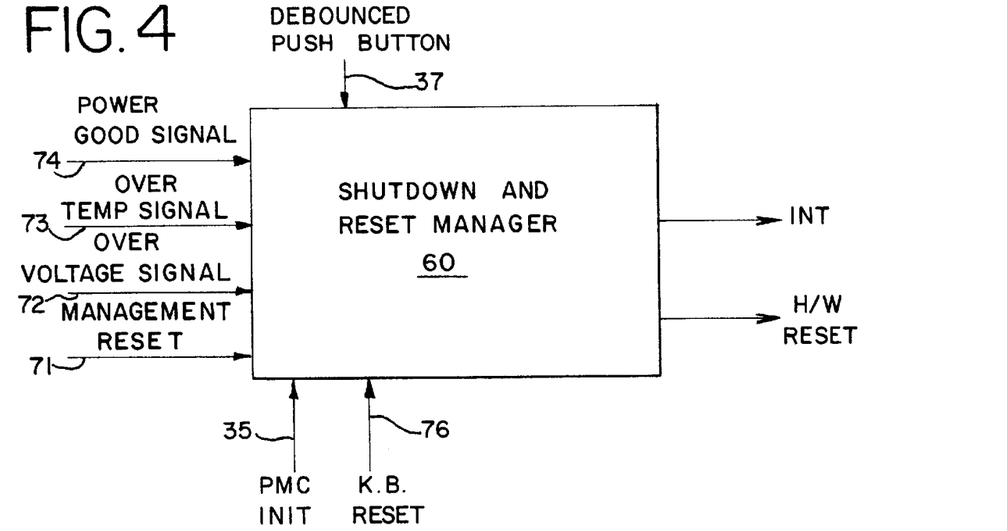
FIG. 4 is a block diagram of the shutdown and reset manager in FIG. 3.

The assertion of the management reset line is one of several shutdown/reset conditions in a preferred embodiment. The shutdown/reset conditions are conditions that require that the embedded system 10 be shutdown or reset. The block diagram of the shutdown and reset manager 60 in FIG. 4 shows inputs for signals that indicate representative examples of shutdown/reset conditions in a preferred embodiment. Examples of such conditions include a system lockup, a timeout of a watchdog timer, an over temperature condition, an over voltage condition or the loss of a POWER GOOD signal from one or more modules. The system lockup and watchdog timer timeout conditions may be indicated by the management reset signal.

The management reset 71, over temperature 73, over voltage 72 and loss of POWER GOOD signals 74, shown in FIG. 4, may be generated in different ways. For example, the signals may be generated by the shutdown management driver 62 (in FIG. 3). The shutdown management driver 62 may be located on the management card described above with reference to FIG. 2. The management card may include a watchdog timer or hardware and software components for monitoring temperature in the chassis, voltage at the power source or other signal and power signals at other cards. The management reset 71, over temperature 73, over voltage 72 and loss of POWER GOOD signals 74 may also be generated according to particular functions. For example, one example of an over temperature signal may be generated by a circuit that monitors a temperature sensor located near the processor. When the temperature sensor detects that the temperature of the processor 56 may have reached destructive levels, the circuit generates an over temperature signal shown in FIG. 4.

When a shutdown/reset condition is received by the shutdown and reset manager 60, the shutdown and reset manager 60 will either generate the interrupt signal at the INT input of the microprocessor 56 or generate the hardware reset, depending on the condition received. Any of the conditions may generate the interrupt; however, conditions such as the over temperature or over voltage conditions may generate the hardware reset to prevent destruction of components in the system.

The generation of the interrupt will cause the operating system to perform an orderly shutdown. The shutdown and reset manager 60 inhibits any hardware reset until the operating system has completed the shutdown. Once the shutdown of the operating system is complete, the hardware may be reset by either the pressing of the reset button 32 by the user or by the release and re-assertion of the management reset signal 71. The hardware reset using the reset button 32 may be used if the shutdown was caused by a fault condition such as the over temperature, over voltage or system lockup conditions. Once the system is shutdown, the user would perform any necessary maintenance and press the reset button when complete. The release and re-assertion of the management reset signal may be performed by the shutdown management driver 62 (in FIG. 3) according to hardware and software that may sense corrected conditions.

In a preferred embodiment, the shutdown and reset manager 60 is an ALTERA™ 7128 PLD, which is a programmable logic device that may be programmed to perform the functions of the shutdown and reset manager 60 as described above. For example, the PLD may be programmed to implement a state machine such as the one described below with reference to FIG. 6. The state machine in FIG. 6 may be implemented using the software in the Microfiche Appendix. The software in the Microfiche Appendix has been written in VHDL, a hardware description language that is known to those of skill in the art. The reader is directed to the notice regarding copyright set forth above.

In alternative embodiments, the shutdown and reset manager 60 may be implemented using software that may be invoked using interrupts, polling or other suitable techniques.

Figure 5:
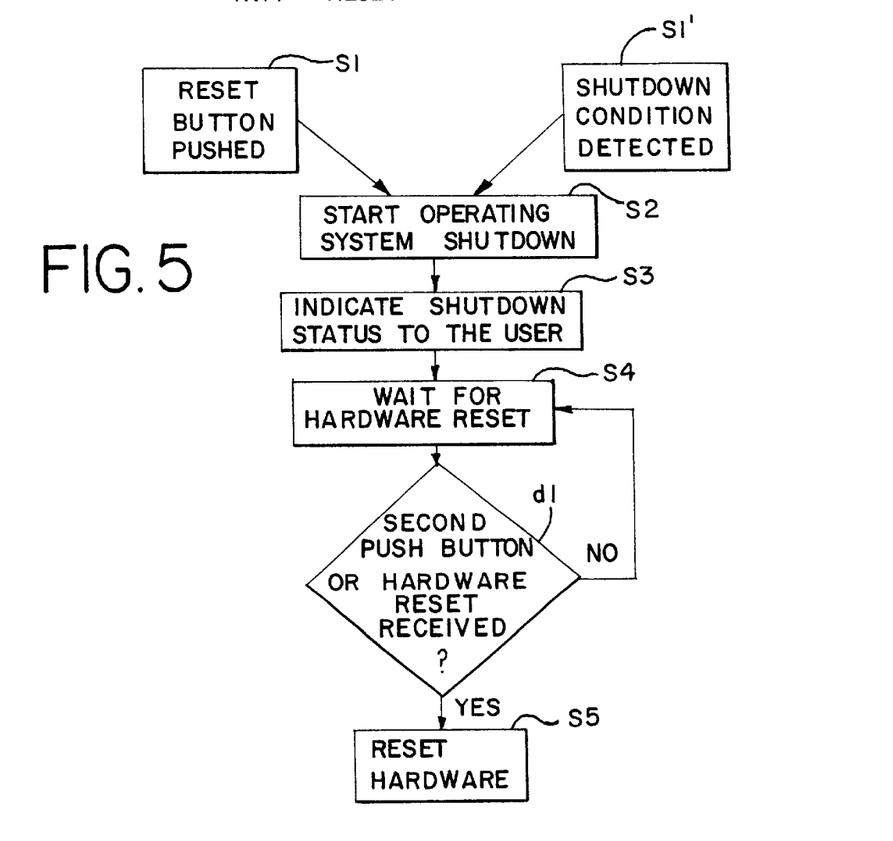
FIG. 5 is a flowchart of a method of performing a shutdown and reset of an embedded system and FIG. 6 is a state diagram of the shutdown and reset manager of FIG. 5.

FIG. 5 is a flowchart of a method for shutting down and resetting the embedded system. One of ordinary skill in the art will appreciate that the flowchart in FIG. 5 may be carried out using a variety of different hardware and software configurations. One such configuration includes the shutdown and reset manager described above with reference to FIGS. 3 and 4.

The method begins at step s1 or s1' in FIG. 5 with a shutdown and reset action. At step s1, the shutdown and reset action is the press of the reset button 32 by the user. The occurrence of either step s1 or s1' will cause the operating system to begin to shutdown as shown at step s2. The shutdown of the operating system includes a disk synchronization process in which any open temporary files may be saved and the status of the system stored for use when the system is restarted. The initiation of the shutdown of the system may be indicated on the status display 34 as shown at step s3.

Once the operating system has completed the shutdown operation, the shutdown and reset manager waits for a hardware reset signal at decision block d1. The shutdown management driver may receive the hardware reset signal as a second push of the reset button 32 (in FIG. 1), or by a trigger through the reset line. When the hardware reset signal is received, the shutdown and reset manager performs all hardware reset functions.

Figure 6:
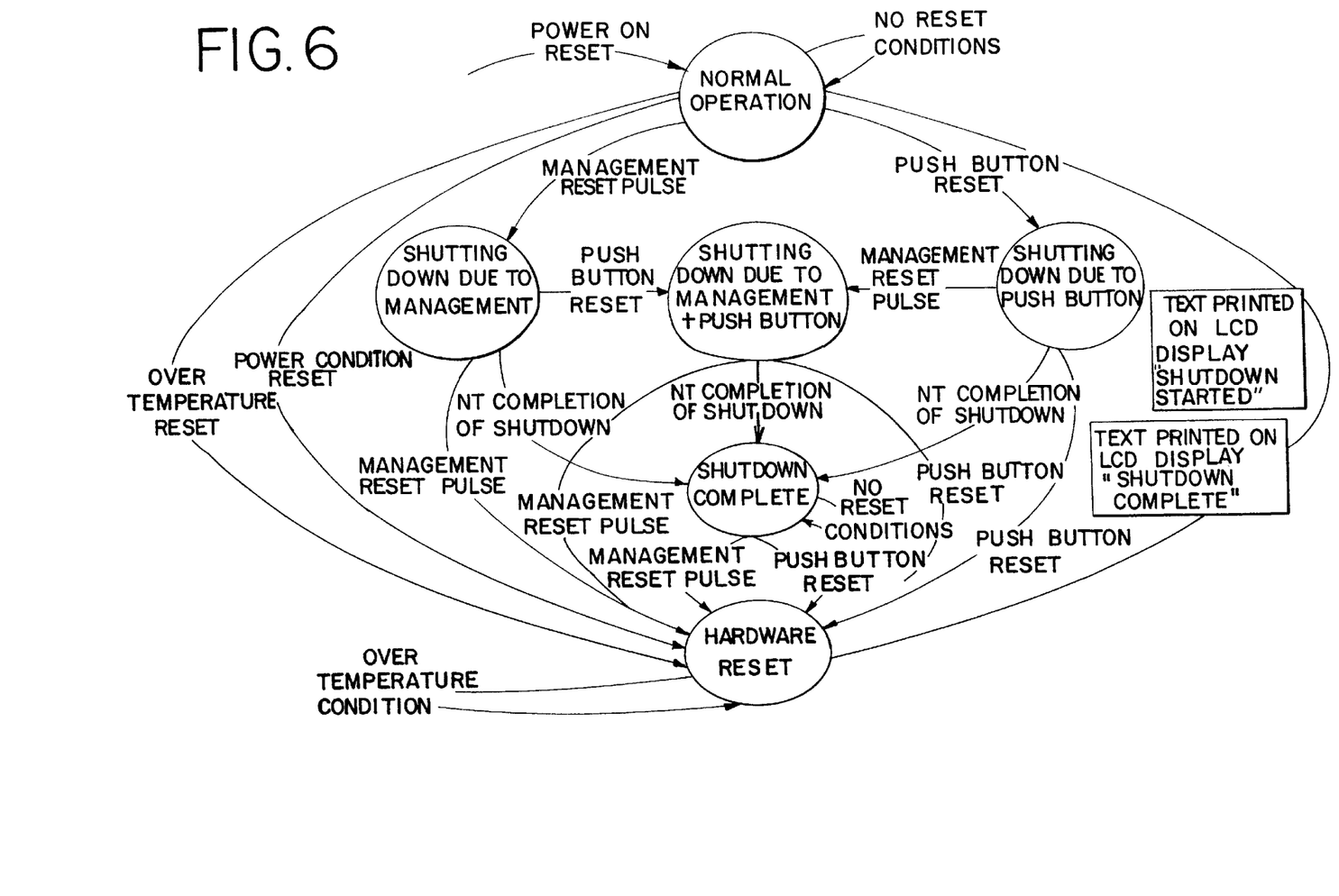

The state machine in FIG. 6 illustrates one embodiment of the flowchart in FIG. 5. Step s1 is represented in the state machine of FIG. 6 by the transition from 'NORMAL OPERATION' to 'SHUTTING DOWN DUE TO PUSH BUTTON.'

At step s1', the shutdown and reset action is triggered upon sensing the occurrence of a shutdown condition. Step s1 is represented in the state machine of FIG. 6 by the transition from 'NORMAL OPERATION' to 'SHUTTING DOWN DUE TO MANAGEMENT.'

According to the state machine in FIG. 6, the shutdown condition that causes this transition is the shutdown condition received from the shutdown management driver 62 (in FIG. 3). The over temperature and power condition signals cause a transition to the 'HARDWARE RESET' state. If the shutdown condition from the shutdown management driver 62 is received while in the 'SHUTTING DOWN DUE TO PUSH BUTTON' state, or if the push button reset is received while in the 'SHUTTING DOWN DUE TO MANAGEMENT' state, the 'SHUTTING DOWN DUE TO MGMT & PUSH BUTTON' state is entered. During the 'SHUTTING DOWN DUE TO MANAGEMENT', 'SHUTTING DOWN DUE TO PUSH BUTTON' and 'SHUTTING DOWN DUE TO MGMT & PUSH BUTTON' states, the operating system (in FIG. 6, WINDOWS NT™ is assumed) performs its shutdown.

When the operating system has completed its shutdown, the 'SHUTDOWN COMPLETE' state is entered. If the push button reset is pressed, or if the management reset is generated before the operating system has completed its shutdown, then the 'HARDWARE RESET' state is entered. Ordinarily, the user waits for the 'SHUTDOWN COMPLETE' state to press the reset push button. When the push button reset is pressed, or when the management reset is received while in the 'SHUTDOWN COMPLETE' state, the 'HARDWARE RESET' state is entered.

While the invention has been described in conjunction with presently preferred embodiments of the invention, persons of skill in the art will appreciate that variations may be made without departure from the scope and spirit of the invention. For example, variations may be made, or exist in the types of conditions that may be monitored for shutdown/reset, the manner of implementing the shutdown and reset manager, the manner of implementing the shutdown management driver, and the type of embedded system application used. This true scope and spirit is defined by the appended claims, interpreted in light of the foregoing.

We claim:

1. A system for shutting down an embedded system having a general purpose computing platform comprising:

a storage system, the general purpose computing platform being operable to execute a plurality of general purpose applications stored in the storage system, said general purpose applications being operable to provide a user with computing functions during execution;

an operating system operable to provide resources for an embedded application and general purpose computing, the embedded application operable to create and maintain a plurality of temporary data files, the storage system being operable to store the plurality of temporary data files and to close the temporary data files during an orderly shutdown of the operating system;

the embedded application operable to perform selected real-time functions using the temporary data files, the embedded application comprising hardware and software components for monitoring at least one shutdown condition and a shutdown management driver operable to generate a management reset in response to at least one shutdown condition; and a shutdown and reset manager for sensing said management reset, said shutdown and reset manager being operable to initiate the orderly shutdown of the operating system in response to the reset signal and to complete the orderly shutdown when the storage system has closed the temporary data files, thereby preventing the destruction of the temporary data files.

2. The system of claim 1 wherein said shutdown management driver further generates a second management reset; and said shutdown and reset manager generates a hardware reset in response to the second management reset.

3. The system of claim 1 further comprising:

a display device for displaying a shutdown status message.

4. An embedded system comprising:

a general purpose computing platform comprising a processor and a storage system, the general purpose computing platform being operable to execute a plurality of general purpose applications stored in the storage system, said general purpose applications being operable to provide a user with computing functions during execution;

an operating system executing in the general purpose computing platform, the operating system operable to provide computing resources to the general-purpose applications, the storage system being operable to store a plurality of temporary data files and to close the temporary data files during an orderly shutdown of the operating system;

an embedded application to perform selected real-time functions, the embedded application operable to create and maintain the plurality of temporary data files the embedded application comprising hardware and software components for monitoring at least one shutdown condition and a shutdown management driver operable to generate at least one reset signal in response to the shutdown condition; and a shutdown and reset manager in the general purpose computing platform, the shutdown and reset manager operable to receive the reset signal and to initiate the orderly shutdown of the operating system in response to the reset signal and to complete the orderly shutdown when the storage system has closed the temporary data files.

5. The embedded system of claim 4 wherein:

the embedded application comprises a plurality of cards connected to the general purpose computing platform by a bus system; and wherein each said card includes the hardware and software components for monitoring the at least one shutdown condition.

6. The embedded system of claim 5 wherein:

the embedded application further comprises a management card having the shutdown and reset management driver, the management card connected to the plurality of cards by the bus system to receive the at least one shutdown condition and to input the at least one shutdown condition to the shutdown and reset management driver.

7. The embedded system of claim 6 wherein the at least one shutdown condition monitored by the hardware and software components on the plurality of cards includes an over temperature condition on a selected one of the plurality of cards.

8. The embedded system of claim 7 wherein the shutdown and reset manager is operable to generate a hardware reset when the shutdown management driver generates the reset signal in response to the over temperature condition, said hardware reset being operable to re-initialize the embedded system.

9. The embedded system of claim 6 wherein the at least one shutdown condition monitored by the hardware and software components on the plurality of cards includes an over voltage condition on a selected one of the plurality of cards.

10. The embedded system of claim 9 wherein the shutdown and reset manager is operable to generate a hardware reset when the shutdown management driver generates the reset signal in response to the over voltage condition, said hardware reset being operable to re-initialize the embedded system.

11. The embedded system of claim 6 wherein the at least one shutdown condition monitored by the hardware and software components on the plurality of cards includes a loss of power good condition on a selected one of the plurality of cards.

12. The embedded system of claim 11 wherein the shutdown management driver generates a second management reset signal when a power good condition is sensed by the shutdown management driver.

13. The embedded system of claim 6 wherein the at least one shutdown condition monitored by the hardware and software components on the plurality of cards includes a system lockup condition on a selected one of the plurality of cards.

14. The embedded system of claim 13 wherein the shutdown and reset manager is operable to generate a hardware reset when the shutdown management driver generates the reset signal in response to the system lockup condition, said hardware reset being operable to re-initialize the embedded system.

15. The embedded system of claim 6 wherein the hardware and software components includes a watchdog timer and the at least one shutdown condition monitored by the watchdog timer on the plurality of cards includes a watch dog timer timeout.

16. The embedded system of claim 6 further comprising a chassis to support the plurality of cards of the embedded application wherein the management card further comprises hardware and software components for monitoring at least one shutdown condition for the chassis.

17. The embedded system of claim 16 wherein the at least one shutdown condition for the chassis includes an over temperature condition in the chassis.

18. The embedded system of claim 17 wherein the shutdown and reset manager is operable to generate a hardware reset when the shutdown management driver generates the reset signal in response to the over temperature condition, said hardware reset being operable to re-initialize the embedded system.

19. The embedded system of claim 17 wherein the at least one shutdown condition for the chassis includes an over voltage condition in the chassis.

20. The embedded system of claim 19 wherein the shutdown and reset manager is operable to generate a hardware reset when the shutdown management driver generates the reset signal in response to the over voltage condition, said hardware reset being operable to re-initialize the embedded system.

21. The embedded system of claim 12 wherein the hardware and software components includes a chassis watchdog timer and the at least one shutdown condition monitored by the chassis watchdog timer on the plurality of cards includes a watch dog timer timeout.

22. The embedded system of claim 4 further comprising:

a display device for displaying a shutdown status message.

23. The embedded system of claim 1 wherein the embedded application uses the storage system for memory resources, the embedded application being operable to shutdown when the shutdown and reset manager completes the orderly shutdown.

24. The embedded system of claim 23 wherein the embedded application is stored in memory on a card connected to a bus system on the computing system, the card comprising an embedded processor for performing the embedded application.

25. The embedded system of claim 24 wherein the card comprising the embedded application further includes a reset button to generate a second reset signal when a user presses the reset button, the second reset signal operable to generate a hardware reset, said hardware reset being operable to re-initialize the embedded system.

26. An improvement to a network access server for providing network communications control, the network access server comprising:

a general purpose computing platform comprising a processor and a storage system, the general purpose computing platform being operable to execute a plurality of general purpose applications stored in the storage system, said general purpose applications being operable to provide a user with computing functions during execution;

an operating system executing in the general purpose computing platform, the operating system operable to provide computing resources to the general-purpose applications;

a telephone line interface and network access application comprising at least one telephone line interface connected to a computer network interface by a high-speed bus, the telephone line interface and network access application operable to perform network access functions and to create and maintain a plurality of temporary data files and to store the plurality of temporary data files in the storage system, the improvement comprising:

the telephone line interface and network access application comprising hardware and software components for monitoring at least one shutdown condition and a shutdown management driver operable to generate at least one reset signal in response to the shutdown condition; and a shutdown and reset manager in the general purpose computing platform, the shutdown and reset manager operable to receive the reset signal and to initiate an orderly shutdown of the operating system in response to the reset signal, the storage system being operable to store a plurality of temporary data files and to close the temporary data files during the orderly shutdown of the operating system.

27. The improvement of claim 26 wherein:

the telephone line interface and network access application comprises a plurality of cards connected to the general purpose computing platform by the high-speed bus; and wherein each said card includes the hardware and software components for monitoring the at least one shutdown condition.

28. The improvement of claim 27 wherein:

the telephone line interface and network access application further comprises a management card having the shutdown and reset management driver, the management card connected to the plurality of cards by the high-speed bus to receive the at least one shutdown condition and to input the at least one shutdown condition to the shutdown and reset management driver.

29. The improvement of claim 28 wherein the at least one shutdown condition monitored by the hardware and software components on the plurality of cards includes an over temperature condition on a selected one of the plurality of cards.

30. The improvement of claim 29 wherein the shutdown and reset manager is operable to generate a hardware reset when the shutdown management driver generates the reset signal in response to the over temperature condition, said hardware reset being operable to re-initialize the network access server.

31. The improvement of claim 28 wherein the at least one shutdown condition monitored by the hardware and software components on the plurality of cards includes an over voltage condition on a selected one of the plurality of cards.

32. The improvement of claim 31 wherein the shutdown and reset manager is operable to generate a hardware reset when the shutdown management driver generates the reset signal in response to the over voltage condition, said hardware reset being operable to re-initialize the network access server.

33. The improvement of claim 28 wherein the at least one shutdown condition monitored by the hardware and software components on the plurality of cards includes a loss of power good condition on a selected one of the plurality of cards.

34. The improvement of claim 33 wherein the shutdown management driver generates a second management reset signal when a power good condition is sensed by the shutdown management driver.

35. The improvement of claim 28 wherein the at least one shutdown condition monitored by the hardware and software components on the plurality of cards includes a system lockup condition on a selected one of the plurality of cards.

36. The improvement of claim 35 wherein the shutdown and reset manager is operable to generate a hardware reset when the shutdown management driver generates the reset signal in response to the system lockup condition, said hardware reset being operable to re-initialize the network access server.

37. The improvement of claim 28 wherein the hardware and software components includes a watchdog timer and the at least one shutdown condition monitored by the watchdog timer on the plurality of cards includes a watch dog timer timeout.

38. The improvement of claim 28 further comprising a chassis to support the plurality of cards of the telephone line interface and network access application wherein the management card further comprises hardware and software components for monitoring at least one shutdown condition for the chassis.

39. The improvement of claim 38 wherein the at least one shutdown condition for the chassis includes an over temperature condition in the chassis.

40. The improvement of claim 39 wherein the shutdown and reset manager is operable to generate a hardware reset when the shutdown management driver generates the reset signal in response to the over temperature condition, said hardware reset being operable to re-initialize the network access server.

41. The improvement of claim 39 wherein the at least one shutdown condition for the chassis includes an over voltage condition in the chassis.

42. The improvement of claim 41 wherein the shutdown and reset manager is operable to generate a hardware reset when the shutdown management driver generates the reset signal in response to the over voltage condition, said hardware reset being operable to re-initialize the network access server.

43. The improvement of claim 28 wherein the hardware and software components includes a chassis watchdog timer and the at least one shutdown condition monitored by the chassis watchdog timer on the plurality of cards includes a watch dog timer timeout.

44. The improvement of claim 27 further comprising:

a display device for displaying a shutdown status message.

45. The improvement of claim 4 wherein the telephone line interface and network access application uses the storage system for memory resources, the telephone line interface and network access application being operable to shutdown when the shutdown and reset manager completes the orderly shutdown.

46. The improvement of claim 45 wherein the telephone line interface and network access application is stored in memory on a card connected to the high-speed bus on the network access server, the card comprising an embedded processor for performing the telephone line interface and network access application.

47. The improvement of claim 46 wherein the card comprising the telephone line interface and network access application further includes a reset button to generate a second reset signal when a user presses the reset button, the second reset signal operable to generate a hardware reset, said hardware reset being operable to re-initialize the network access server.

48. The improvement of claim 27 wherein the operating system is the WINDOWS operating system from Microsoft.

49. A method for shutting down an embedded system having a general-purpose computing platform, an operating system, a storage system and an embedded application, the method comprising the steps of:

the embedded application opening and maintaining a plurality of temporary data files;

detecting a shutdown condition and generating a reset signal in response to the shutdown condition;

receiving the reset signal at a shutdown and reset manager in the general purpose computing platform;

the shutdown and reset manager initiating an orderly shutdown of the operating system in response to the reset signal by a method comprising the step of saving any open temporary files; and completing the shutdown of the operating system after the open temporary files have been saved.

* * * * *